S. A. DEATHERAGE.
TIRE.
APPLICATION FILED MAY 20, 1910.
1,027,999.
Patented May 28, 1912.
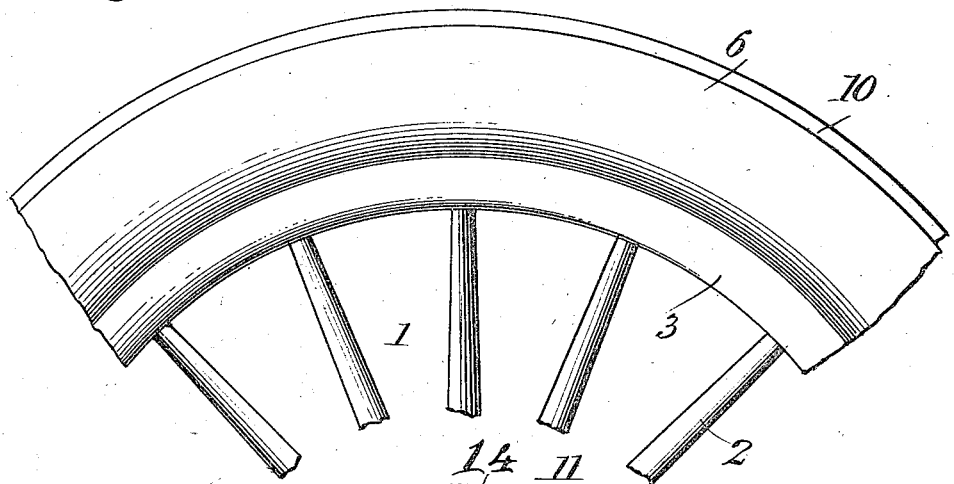
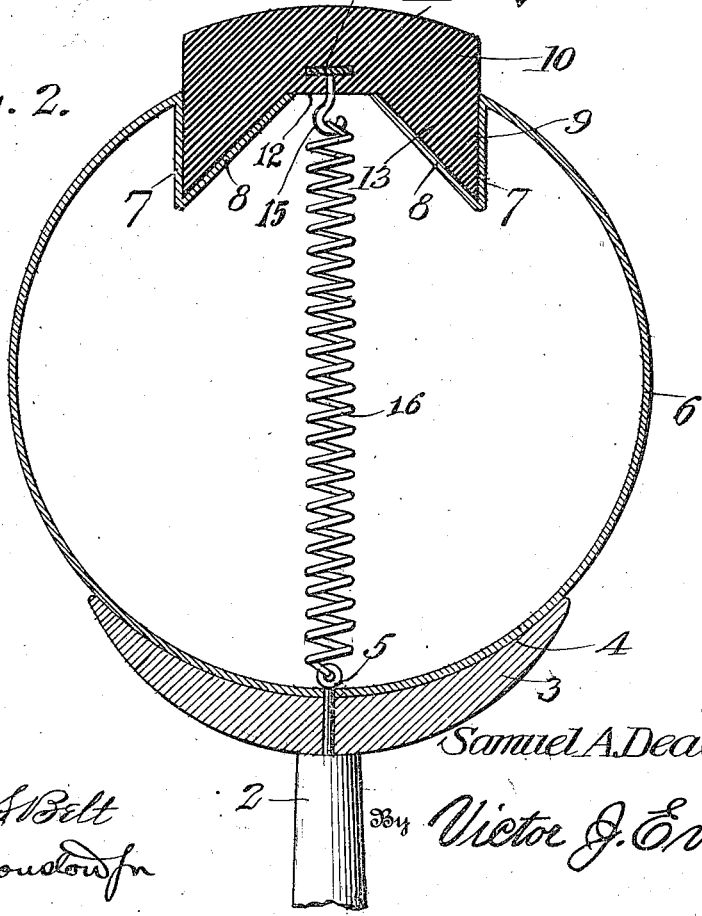
Witnesses
Inventor
Samuel A. Deatherage
By Victor J. Evans
Attorney

UNITED STATES PATENT OFFICE.

SAMUEL A. DEATHERAGE, OF RICHMOND, KENTUCKY.

TIRE.

1,027,999.   Specification of Letters Patent.   Patented May 28, 1912.

Application filed May 20, 1910. Serial No. 562,472.

*To all whom it may concern:*

Be it known that I, SAMUEL A. DEATHERAGE, a citizen of the United States, residing at Richmond, in the county of Madison and State of Kentucky, have invented new and useful Improvements in Tires, of which the following is a specification.

This invention relates to tires and particularly to that type which are adapted for automobile use.

The object of the invention is the provision of a resilient tire which will obviate the difficulties encountered with pneumatic tires, *i. e.*, puncturing and blowouts, and which will be extremely light, cheaply made and equally efficient in practice as the pneumatic tire.

Further objects of the invention will appear as the following specific description is read in connection with the accompanying drawing, which forms a part of this application, and in which:—

Figure 1 is a detail side elevation of a wheel employing my improved tire. Fig. 2 is a sectional view of the same.

Referring more particularly to the drawings, 1 represents the wheel, 2 the spokes thereof, and 3 the felly having the usual tire channel 4. Secured to the channel in any suitable manner, preferably by eye bolts 5, is a tube 6 which is substantially cylindrical in cross section and which surrounds the wheel as shown. The periphery of this type is broken as shown and the free ends are bent into inwardly extending flanges 7 which have a portion of their body bent outwardly to form flanges 8. These latter flanges are arranged at an acute angle to the flanges 7 and form pockets 9.

The tread of the tire comprises a rubber body 10 with a rounded outer face 11 and the body is guttered as at 12 to form the V-shaped flanges 13 which enter the pockets 9.

A circular plate 14 is embedded in the tire and has projecting therefrom hooks or eyes 15 which are connected to the bolts 5 by spiral springs 16. In this manner, the tread is rigidly held in connection with the tire without the use of cement or other securing means and the tire is permitted to flex under the weight of a vehicle.

Having thus described the invention, what is claimed is—

In a device of the class described, the combination with a felly having a tire channel, of a tire secured in the channel and comprising a resilient metallic tube having an open periphery, V-shaped flanges formed from the edges of said tube and extending into the same, a cushion tread surrounding the tire and bridging the opening in the tube, separated V-shaped legs formed on the tread and extending into the pockets, and springs directly connecting the tread and felly for holding the tread on the tire.

SAMUEL A. DEATHERAGE.

Attest:
   J. S. COLLINS,
   LIRG TOM CHINAUTT.

Copies of this patent may be obtained for five cents each, by addressing the "Commissioner of Patents, Washington, D. C."